US012642194B2

(12) United States Patent
Kirk

(10) Patent No.: US 12,642,194 B2
(45) Date of Patent: Jun. 2, 2026

(54) DEGRADABLE EXTRUDED NETTING MADE FROM POLYMER BLEND COMPOSITIONS

(71) Applicant: DelStar Technologies, Inc., Middletown, DE (US)

(72) Inventor: Jeffrey David Kirk, St. Paul, MN (US)

(73) Assignee: DelStar Technologies, Inc.

( * ) Notice: Subject to any disclaimer, the term of this patent is extended or adjusted under 35 U.S.C. 154(b) by 778 days.

(21) Appl. No.: 17/618,376

(22) PCT Filed: Jun. 12, 2020

(86) PCT No.: PCT/US2020/037388
§ 371 (c)(1),
(2) Date: Dec. 10, 2021

(87) PCT Pub. No.: WO2020/252233
PCT Pub. Date: Dec. 17, 2020

(65) Prior Publication Data
US 2022/0304254 A1 Sep. 29, 2022

Related U.S. Application Data

(60) Provisional application No. 62/860,931, filed on Jun. 13, 2019.

(51) Int. Cl.
*A01G 13/02* (2006.01)
*A01G 13/32* (2025.01)
(Continued)

(52) U.S. Cl.
CPC .............. *A01G 13/32* (2025.01); *C08L 67/02* (2013.01); *C08L 67/04* (2013.01); *C08L 2201/06* (2013.01); *C08L 2203/16* (2013.01)

(58) Field of Classification Search
CPC ..... A01G 13/0268; C08L 67/02; C08L 67/04; C08L 2201/06; C08L 2203/16
See application file for complete search history.

(56) References Cited

U.S. PATENT DOCUMENTS 4,931,488 A * 6/1990 Chiquet ............... C08K 5/0033 524/398
5,883,199 A * 3/1999 McCarthy .................. C08J 5/18 525/437
(Continued)

FOREIGN PATENT DOCUMENTS

CA 3114589 A1 4/2020
CN 1995136 A 7/2007
(Continued)

OTHER PUBLICATIONS

[NPL-1] Chimoto et al. (JP H10-201367 A); Aug. 4, 1998 (EPO machine translation to English). (Year: 1998).*
(Continued)

*Primary Examiner* — Donald M Flores, Jr.
(74) *Attorney, Agent, or Firm* — Farber LLC

(57) ABSTRACT

Degradable extruded nettings are provided. Degradable extruded nettings may include a plurality of interconnected strands, at least some of the strands being made from a polymeric blend, the polymeric blend including a polylactic acid polymer composition, polybutylene succinate, and a degradation additive, the degradation additive including a degrader in a carrier resin are provided. Grass sod and methods for preparing grass sod using such degradable extruded nettings are also provided.

18 Claims, 7 Drawing Sheets

(51) Int. Cl.
*C08L 67/02* (2006.01)
*C08L 67/04* (2006.01)

(56) References Cited

U.S. PATENT DOCUMENTS

| | | | |
|---|---|---|---|
| 9,017,587 B2 | 4/2015 | Huang et al. | |
| 2005/0183329 A1 | 8/2005 | Cederblad et al. | |
| 2005/0217173 A1 | 10/2005 | Walraevens et al. | |
| 2009/0274920 A1* | 11/2009 | Li | B32B 7/12 264/210.1 |
| 2010/0249332 A1 | 9/2010 | Ferguson | |
| 2013/0147087 A1 | 6/2013 | Huang et al. | |
| 2018/0142060 A1 | 5/2018 | Yang | |

FOREIGN PATENT DOCUMENTS

| | | | | |
|---|---|---|---|---|
| CN | 106633722 A | 5/2017 | | |
| CN | 106905597 A | 6/2017 | | |
| CN | 104514041 B | 9/2018 | | |
| EP | 2300645 A2 | 3/2011 | | |
| EP | 3560996 A1 | 10/2019 | | |
| FR | 3055336 A1 | * | 3/2018 | B65D 81/00 |
| JP | 10201367 A | * | 8/1998 | |
| KR | 10-1149832 B1 | | 5/2012 | |
| WO | 2015042641 A1 | | 4/2015 | |
| WO | 2019122191 A1 | | 6/2019 | |
| WO | 2020064725 A1 | | 4/2020 | |
| WO | 2020072590 A1 | | 4/2020 | |

OTHER PUBLICATIONS

[NPL-2] Chauvel et al. (FR 3055336 A1); Mar. 2, 2018 (EPO machine translation to English). (Year: 2018).*

[NPL-3] "What is PBAT plastic? Pros and cons of PBAT"; EUROPLAS (accessed Sep. 26, 2024); < https://europlas.com.vn/en-US/blog-1/what-is-pbat-plastic-pros-and-cons-of-pbat>. (Year: 2024).*

[NPL-4] "Polybutylene adipate terephthalate"; Wikipedia® The Free Encyclopedia (accessed Sep. 26, 2024); <https://en.wikipedia.org/wiki/Polybutylene_adipate_terephthalate>. (Year: 2024).*

China National Intellectual Property Administration ("CNIPA"); Office Action dated Mar. 10, 2023; PRC (China) Patent Application No. 202080056957.1.

European Patent Office (EPO); Communication Rule 62 EPC, the Supplementary European search report and the European search opinion; Patent Application No. 20822644.9 dated Mar. 29, 2023.

China National Intellectual Property Administration ("CNIPA"); Office Action dated Oct. 14, 2022; PRC (China) Patent Application No. 202080056957.1.

International Search Report and Written Opinion; PCT/US2020/037388; Oct. 21, 2020.

* cited by examiner

QUV TESTING (MODIFIED ASTM 4329 FOR PLA TESTING)

TOTAL QUV HOURS AGED (INCLUDES UV AND CONDENSATION HOURS)

MD STRENGTH (% OF ORIGINAL)

EXAMPLE 5: POLYPROPYLENE-2
EXAMPLE 6: 3% IRON STEARATE
EXAMPLE 3: PLA/PBAT CONTROL
EXAMPLE 7: 5% IRON STEARATE

DEGRADABLE EXTRUDED NETTING MADE FROM POLYMER BLEND COMPOSITIONS

CROSS-REFERENCE TO RELATED APPLICATIONS

This application is the National State of International Application No. PCT/US2020/037388 filed Jun. 12, 2020 which claims the benefit of U.S. Provisional Application Ser. No. 62/860,931, filed Jun. 13, 2019, the entire disclosure of which is incorporated herein by reference for all purposes.

BACKGROUND

The field of the present disclosure relates to extruded plastic netting and even more particularly, to a degradable extruded netting including a plurality of interconnected strands for use with grass sod.

In conventional methods of growing grass sod, grass seeds are planted in soil. After raising a grass crop until the roots are sufficiently interwoven such that the sod will hang together as a cohesive carpet-like mat when cut, the sod can be peeled or rolled and removed from underlying soil. Often times, the soil layer includes a synthetic structure, such as netting, to assist in keeping the sod intact and coherent after harvesting.

Extruded plastic netting is used in a number commercial applications, such as erosion control applications, support netting of climbing plants, barrier fencing, tree guards, grass sod netting and the like. Currently, a typical extrusion process for manufacturing plastic netting includes extruding individual plastic strands in an interconnecting network to provide a net-like structure. Conventional plastic netting and methods for making the same are disclosed in U.S. Pat. Nos. 3,700,521; 3,767,353; 3,723,218; 4,123,491; 4,152,479 and 4,190,692, the complete disclosures of which are incorporated by reference herein in their entireties.

Existing plastic netting is typically manufactured from a variety of base resins that are non-corrosive, wear-resistant, chemical resistant and/or rugged, such as metal, polyethylene, polypropylene, nylon, polyester and the like. Colors and additives can be introduced during the extrusion process to produce distinct colors or properties, such as stabilization against ultraviolet light degradation.

One of the drawbacks with existing plastic nettings is that the materials used to make these nettings are generally not degradable or renewable. Thus, they consume more landfill area and produce more harm to the environment than desired.

Accordingly, it would be desirable to provide improved extruded netting having acceptable mechanical strength that is manufactured with easily processable, degradable materials derived from renewable resources.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

In one aspect, illustrative embodiments relate to degradable extruded nettings including a plurality of interconnected strands. At least some of the strands of the netting are made from a polymeric blend including: a polylactic acid composition; and a polybutylene succinate composition. In certain embodiments, the polymeric blend further includes a degradation additive. At least some of the strands of the netting are made from a polymeric blend including: a polylactic acid composition; a polybutyrate composition; a polylactic acid-polybutyrate compatibilizer composition; and a degradation additive. The degradation additive may include a degrader in a carrier resin.

In certain embodiments, the polymer blend contains the polylactic acid composition in an amount ranging from about 40% to about 60% by weight, and the polybutylene succinate (PBS) in an amount ranging from about 40% to about 60% by weight. The polymer blend further includes a degradation additive in an amount ranging from about 0.1% to about 5% by weight.

The polylactic acid composition may include one or more polymers derived at least in part from lactide or lactic acid, such polymers being referred to, collectively, herein as polylactide or PLA. In certain embodiments, the polylactic acid composition comprises one or more polylactic acid polymers derived from plant starch, such as a linear aliphatic thermoplastic polyester derived from renewable resources such as corn.

The PBS composition can include one or more polymers including an aliphatic polyester that has been produced by polycondensation of succinic acid or any derivative thereof with 1,4-butanediol.

The degradation additive preferably includes a degrader in a carrier resin. In one or more embodiments, the carrier resin constitutes from about 90% to about 99% by weight of the degradation additive, with the balance being a degrader. In embodiments, the carrier resin is biodegradable, transparent and derived from a renewable resource.

The degradation additive may comprise a number of suitable degradation additives that cause the degradation of plastic materials based primarily on exposure to heat. In certain embodiments, the degradation additive comprises iron stearate, manganese stearate, a metal carboxylate or any suitable combination thereof.

In another aspect of the disclosure, a polymeric blend composition for preparing a degradable extruded netting includes a polylactic acid (PLA) composition in an amount ranging from about 55% to about 60% by weight, a polybutyrate composition in an amount ranging from about 35% to about 40% by weight, a compatibilizer composition in an amount ranging from about 0.5% to 3% by weight and a degradation additive in an amount ranging from about 2% to about 7% by weight.

The polybutyrate composition may comprises one or more polybutyrate adipate terephthalate (PBAT) polymers. The compatibilizer composition may include any composition that helps ensure that a substantially homogenous mixture of PLA and PBAT is achieved. In certain embodiments, the PLA-PBAT compatibilizer composition includes a mixture of a PLA carrier resin and a compatibilizer, such as polypropyleneglycol di glycidyl ether, epoxidized cottonseed oil (ECSO), or maleinized cottonseed oil (MCSO).

The degradation additive may comprise a number of suitable degradation additives that cause the degradation of plastic materials based primarily on exposure to heat. In certain embodiments, the degradation additive comprises iron stearate, manganese stearate, a metal carboxylate or any suitable combination thereof.

In another aspect, illustrative embodiments relate to grass sod including: grass grown in soil, and a degradable extruded netting in the soil. The netting includes a plurality of interconnected strands, at least some of the strands being made from a polymeric blend including a polylactic acid composition in an amount ranging from about 40% to about 60% by weight, and a polybutylene succinate composition in an amount ranging from about 40% to about 60% by weight. The polymeric blend may further include a degradation additive in an amount ranging from about 0.1% to about 5% by weight.

In yet another aspect illustrative embodiments relate to a method of growing sod including the steps of: providing a netting material in soil, the netting material including a plurality of interconnected strands, at least some of the strands being made from a polymeric blend including a polylactic acid composition in an amount ranging from about 40% to about 60% by weight, and a polybutylene succinate composition in an amount ranging from about 40% to about 60% by weight, and a degradation additive in an amount ranging from about 0.1% to about 5% by weight, and raising a grass crop in the soil.

It is to be understood that both the foregoing general description and the following detailed description are exemplary and explanatory only and are not restrictive of the disclosure. Additional features of the disclosure will be set forth in part in the description which follows or may be learned by practice of the disclosure.

BRIEF DESCRIPTION OF THE DRAWINGS

The accompanying drawings, which are incorporated in and constitute a part of this specification, illustrate several embodiments of the disclosure and together with the description serve to explain the principles of the disclosure.

DETAILED DESCRIPTION

This description and the accompanying drawings illustrate exemplary embodiments and should not be taken as limiting, with the claims defining the scope of the present disclosure, including equivalents. Various mechanical, compositional, structural, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated aspects that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment. Moreover, the depictions herein are for illustrative purposes only and do not necessarily reflect the actual shape, size, or dimensions of the system or illustrated components.

It is noted that, as used in this specification and the appended claims, the singular forms "a," "an," and "the," and any singular use of any word, include plural referents unless expressly and unequivocally limited to one referent. As used herein, the term "include" and its grammatical variants are intended to be non-limiting, such that recitation of items in a list is not to the exclusion of other like items that can be substituted or added to the listed items.

While the following disclosure is presented with respect to degradable extruded netting for use in connection with sod, it should be understood that illustrative embodiments of degradable extruded nettings may be readily adapted for use in a variety of other applications such as: packaging netting, such as for onion and turkey bags; agricultural netting, such as turf netting, turf wrap, hay bale, etc.; erosion control applications; and netting for industrial, filtration and home furnishings applications. Additionally, illustrative degradable extruded nettings may also be adapted for use in composites, fabrics for disposable diapers, incontinent briefs, training pants, bandages, dressings, diaper holders and liners and feminine hygiene garments, medical gowns, medical drapes, mattress pads, blankets, sheets, clothing, consumer wipes and other like products, such as building and construction composites.

Figure 1:
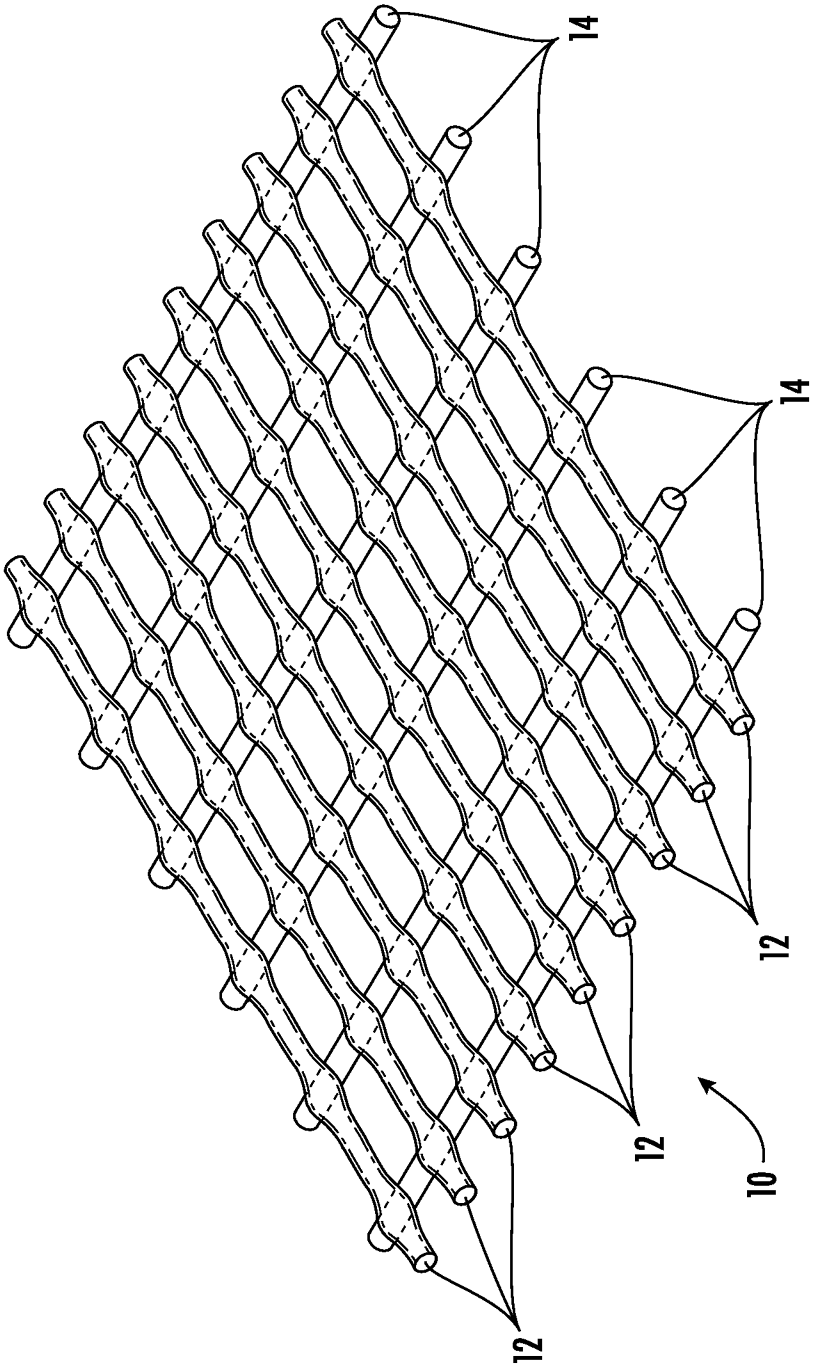
FIG. 1 is a perspective view of a netting in accordance with an illustrative embodiment.

As seen in FIG. 1, netting 10 includes strands 12 extending in one direction and strands 14 extending in a generally crosswise or transverse direction. Strands 12 and 14 are extruded polymeric elongate members which cross and intersect during extrusion to form the net-like structure. Strands 12 and 14 could also be formed of extruded strands that are knitted together rather than crossing during extrusion. In certain embodiments, strands 12 and 14 are made of the same material. In alternative embodiments, strands 12 are made of a different material than strands 14. For example, netting 10 may include 10 to 90 wt. % of the material of strands 12 and 10 to 90 wt. % of the material of strands 14. In other embodiments, netting 10 may include 45 to 55 wt. % of the material of strands 12 and 45 to 55 wt. % of the material of strands 14. In embodiments where strands 12 and 14 are made of the same material, the material from which strands 12 and 14 are made is a degradable composition in accordance with illustrative embodiments. When a material other than a degradable composition is used to manufacture one of the sets of strands 12 or 14, such material may include a non-degradable composition.

Thus, degradable extruded nettings may be manufactured entirely from degradable materials, or from a combination of degradable and non-degradable materials. In certain embodiments, the degradable material used to prepare extruded nettings may include a combination of materials including one or more polylactic acid (PLA) polymer compositions, one or more polybutylene succinate (PBS) polymer compositions, and a degradation additive. In other embodiments, the degradable material used to prepare extruded nettings may include a combination of materials including one or more polylactic acid (PLA) polymer compositions, one or more polybutyrate adipate terephthalate (PBAT) polymer compositions, a PLA-PBAT compatabilizer, and a degradation additive.

PLA Composition

In general, suitable polylactic acid compositions may include one or more polymers derived at least in part from lactide or lactic acid, such polymers being referred to, collectively, herein as polylactide or PLA.

In general, polymer nomenclature sometimes references polymers on the basis of the monomer from which the polymer is made, and in other instances characterizes the polymer based upon the smallest repeating unit found in the polymer. For example, the smallest repeating unit in polylactide is lactic acid (actually residues of lactic acid). However, in typical instances, commercial polylactide will be manufactured by polymerization of lactide monomer, rather than lactic acid. Lactide monomer, of course, is a dimer of lactic acid. Herein the terms "polylactic acid," "polylactide," and "PLA" are intended to include within their scope both polylactic acid-based polymers and polylactide based polymers, with the terms used interchangeably. That is, the terms "polylactic acid," "polylactide," and "PLA" are not intended to be limiting with respect to the manner in which the polymer is formed.

The term "polylactide based" polymer or "polylactic acid based" polymer is meant to refer to polymers of polylactic acid or polylactide, as well as copolymers of lactic acid or lactide, wherein the resulting polymer includes at least 50%, by weight, lactic acid residue repeating units or lactide residue repeating units. In this context, the term "lactic acid residue repeating unit" is meant to refer to the following unit:

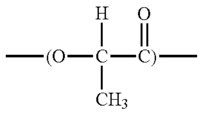

In view of the above definition, it should be clear that polylactide can be referred to both as a lactic acid residue containing polymer and as a lactide residue containing polymer. Herein the term "lactide residue repeating unit" is meant to refer to the following repeating unit:

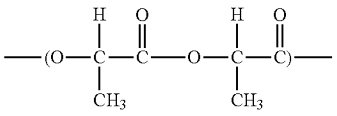

It should be appreciated that the lactide residue repeating unit can be obtained from L-lactide, D-lactide, and meso-lactide. The L-lactide is structured from two S-lactic acid residuals; the D-lactide is structured from two R-lactic acid residuals; and the meso-lactide is structured from both an S-lactic acid residual and an R-lactic acid residual.

In embodiments, the PLA may be a linear aliphatic thermoplastic polyester derived from renewable resources such as corn, and is compostable in many settings. In recent years, PLA has been increasingly utilized in fiber applications such as netting, as it provides a raw material derived from a sustainable and renewable resource.

Plant based PLA derived from corn is well known. Traditionally, after steeping the corn in a mixture to loosen the molecular bonds, the mixture is ground up and centrifuged to separate the corn oil from the starch. Dextrose is then extracted from the starch using hydrolysis. Fermentation ultimately leads the dextrose to form lactic acid. After electrodialysis transforms the lactic acid into lactide, polymerization forms long lactide chains resulting in a fully plant-based PLA.

In embodiments, suitable PLA compositions may include a mixture of PLA polymers, at least some of which are derived from a sustainable and renewable resource, such as from the starch of plants.

In embodiments, a suitable PLA composition may include at least 50% by weight of PLA polymers that have a nominal average molecular weight of about 200,000 Daltons.

PBS Composition

In general, PBS compositions can include one or more polymers including an aliphatic polyester that has been produced by polycondensation of succinic acid or any derivative thereof with 1,4-butanediol. Such biodegradable polymers naturally degrade to carbon dioxide, water, and biomass. In embodiments, suitable PBS compositions may be synthesized via melt condensation polymerization followed by a chain extension with diisocyanate. While bio-based succinic acid is suitable for production of such biodegradable polymers, polyalkylene succinates may be synthesized from petrochemical precursors. In embodiments, suitable PBS compositions may be the commercially available FZ91/FD92, sold under the trade name BioPBS®, available from PTT MCC Biochem Co., Ltd.

PBAT Composition

In general, suitable PBAT compositions may include one or more polymers including a diol-dicarboxylic acid condensation-type polyester which has an aliphatic dicarboxylic acid, an aromatic dicarboxylic acid and an aliphatic diol as its constitutive components. In embodiments, suitable PBAT compositions can include any biodegradable, statistical, aliphatic-aromatic copolyester. In embodiments, suitable PBAT compositions may include at least one an aliphatic-aromatic copolyester based on the monomers 1.4-butanediol, adipic acid, and terephthalic acid in the polymer chain. Such biodegradable polymers eventually degrade to carbon dioxide, water, and biomass when metabolized in the soil or compost under standard conditions. In embodiments, a suitable PBAT composition may be the commercially available F Blend C1200 sold under the trade name Ecoflex®, available from BASF SE.

In embodiments, the PBAT composition includes at least 50% by weight of PBAT polymers. In cases where the PBAT includes polymers having a lower molecular weight than the polymers in in the PLA composition, the PBAT composition, when mixed with the PLA composition, may increase the flexibility of PLA.

PLA-PBAT Compatiblizer Composition

In general, the PLA-PBAT compatibilizer composition is any composition that helps ensure that a substantially homogenous mixture of PLA and PBAT is achieved. In embodiments, the PLA-PBAT compatibilizer composition includes a mixture of a PLA carrier resin and a compatibilizer. In embodiments, the PLA carrier resin constitutes from about 90% to about 99% by weight of the PLA-PBAT compatibilizer composition, with the balance being a compatibilizer. The PLA carrier resin may be any extrusion grade thermoplastic resin that processes easily. In embodiments, the PLA carrier resin is transparent and derived from a renewable resource. In embodiments, the PLA carrier resin may be Biopolymer 2003D sold under the trade name Ingeo™ available from NatureWorks, and may make up 95% by weight of the PLA-PBAT compatibilizer composition. In embodiments, the compatibilizer may be polypropyleneglycol di glycidyl ether (EJ400) or an epoxy based compound, such as epoxidized cottonseed oil (ECSO) or maleinized cottonseed oil (MCSO). Other suitable compatibilizers that may be used in the PLA-PBAT compatibilizer composition include isocyanate compounds including, but not limited to: 4,4'-diphenylmethane diisocyanate, dicyclohexylmethane diisocyanate, 3,3'-dimethyl_4,4'-diphenylmethane diisocyanate, hydrogenated 4,4'-diphenylmethane diisocyanate, 3,3'-tolidine_4,4 diisocyanate, toluene diisocyanate, methylcyclohexane diisocyanate, hexamethylene diisocyanate, isophorone diisocyanate, a toluene diisocyanate, secondary methyl phenylene diisocyanate, hydrogenated secondary-toluylenebismaleimide diisocyanate, tetramethyl xylylene diisocyanate, tetramethylxylylene diisocyanate, methylene diphenyl diisocyanate, 4,4'-diisopropyl diphenyl diisocyanate, polymethylene polyphenyl diisocyanate, phenylene diisocyanate, 1,8-4-isocyanate methyl octane diisocyanate, 1,5-naphthalene diisocyanate, dianisidine diisocyanate, diphenyl ether diisocyanate, lysine methyl ester diisocyanate, lysine ester triisocyanate, triphenyl methane triisocyanate, triisocyanate phenyl phosphorothioate, 1,6,11-undecane triisocyanate, bicyclo heptane triisocyanate, trimethyl hexamethylene triisocyanate, polymethylene polyphenyl isocyanate, or a combination thereof. In embodiments, the compatibilizer may also be Joncryl ADR sold by BASF, Lotader AX8900 sold by Arkema, or Biomax Strong 120 sold by DuPont.

Degradation Additive

In certain embodiments, the degradation additive includes a degrader in a carrier resin. In one or more preferred embodiments, the carrier resin constitutes from about 90% to about 99% by weight of the degradation additive, with the balance being a degrader. In embodiments, the carrier resin is biodegradable, transparent and derived from a renewable resource. In embodiments, the carrier resin may be Biopolymer 2003D sold under the trade name Ingeo™ available from NatureWorks, and may make up 95% of the degradation additive. In embodiments, the degrader includes iron stearate, however, any suitable degrader may be used. A suitable degradable additive is an additive that causes the degradation of plastic materials based primarily on exposure to heat. While metal carboxylates are relatively well known degrader additives, examples of other degrader additives include, but are not limited to, unsaturated organic compound which are auto-oxidizable like ethers, acetals, ketals, amines, aldehydes, natural oils, unsaturated fatty acids and other compounds that help in the generation of free radicals and peroxides that are involved in the oxidation reactions.

Other Additives

In embodiments, conventional additional additives may be included in the composition used to make the extruded netting.

In embodiments, a suitable photo-degradable additive may be used. A suitable photo-degradable additive is an additive that causes the degradation of plastic materials based primarily on exposure to light. Examples of photo-degradable additives include, but are not limited to, photo sensitive polymers like aromatic ketones, aromatic amines, peroxides, quinones, and azo compounds.

In embodiments, a colorant may be included. Colorants are capable of affecting the degradation rate since it can diminish the intensity of the UV rays, by reflect, diffuse, absorb, or defract the UV rays. One suitable colorant includes the green colorant 29025 GN PE Masterbatch, available from PolyOne Corporation of Assesse, Belgium, which is a green colorant in a carrier to impart green color to the resulting extruded netting.

In embodiments, a stabilizer is included. A stabilizer can help to protect the netting from excessive degradation from exposure to UV light. In at least certain embodiments, the stabilizer includes a hindered amine compound, such as an oligomeric hindered amine light stabilizer or hindered amine light stabilizer (HALS).

Illustrative Compositions

In embodiments, the polymeric composition blend used to manufacture degradable extruded netting may include the PLA composition in an amount ranging from about 40% to about 60% by weight and the PBS composition in an amount ranging from about 40% to about 60% by weight. In embodiments, the polymeric composition blend used to manufacture degradable extruded netting may further include a degrader additive in an amount ranging from about 0.1% to 5% by weight. In a preferred embodiment, the polymer blend may comprise the PLA composition in an amount ranging from about 48% to about 52% by weight and the PBS composition in an amount ranging from about 48% to about 52% by weight In other embodiments, the polymeric blend composition for preparing a degradable extruded netting includes a polylactic acid (PLA) composition in an amount ranging from about 55% to about 60% by weight, a polybutyrate composition in an amount ranging from about 35% to about 40% by weight, a compatibilizer composition in an amount ranging from about 0.5% to 3% by weight and a degradation additive in an amount ranging from about 2% to about 7% by weight. In alternative embodiments, the polymeric blend composition includes a polylactic acid (PLA) composition in an amount ranging from about 52% to about 58% by weight, a polybutyrate composition in an amount about 38% by weight, a compatibilizer composition in an amount about 2% by weight and a degradation additive in an amount ranging from about 2% to about 8% by weight.

Preparing Extrudable Compositions

Extrudable compositions can be prepared by any conventional process for forming polymeric compositions. These processes include, but are not necessarily limited to, compounding. Generally, suitable methods for making a suitable polymeric blend composition include compounding, either as a separate operation using a twin-screw extruder, or in-line compounding using a single-screw extruder equipped with a screw that feature good distributive and dispersive mixing characteristics.

Non-Degradable Fiber Compositions

As noted above, in embodiments some of the strands 12, 14 may be made from non-degradable fiber compositions. In embodiments, the non-degradable fiber compositions may include non-elastomeric materials such as nylons, polyesters, polylactic acids, polypropylene, polyethylenes including HDPE and copolymers of such resins. In embodiments, the non-degradable fibers are made from polyolefins. In embodiments, the non-degradable fibers are made from polypropylene.

Net Preparation

Illustrative degradable extruded nettings may be prepared by any suitable extrusion process. Generally, suitable methods for making the extruded netting includes extruding a polymeric blend composition as described above, through dies with reciprocating or rotating parts to form the netting configuration. This creates cross machine direction strands that cross the machine direction strands, which flow continuously. Of course, it should be understood that illustrative degradable polymeric blend compositions could be used to form both the cross-machine direction strands and the machine direction strands, or one or part of the strands, in which case, another material such as a different biodegradable material or a non-degradable material could be used to form the other strands. After the extrusion, the netting is then typically stretched in the machine direction using a differential between two sets of nip rollers. After this, the material is then typically stretched in any suitable manner, such as that described in U.S. Pat. No. 4,152,479, which is incorporated herein by reference, in the cross direction using a tenter frame. It should be understood, that the above described method is just one of many suitable methods that can be employed to manufacture extruded netting in accordance with illustrative embodiments described herein.

EXAMPLES

Further illustrative embodiments are described by the following non-limiting Examples:

Example 1

A degradable extruded film in accordance with this disclosure is manufactured using a mixture including 57% by weight Biopolymer 2003D sold under the trade name Ingeo™ available from NatureWorks as the PLA composition, 38% by weight F Blend C1200 sold under the trade name Ecoflex®, available from BASF SE as the PBAT composition, 2% by weight TECHMER PLAM111474 compatibilizer, and 3% by weight degradation additive, the degradation additive including 5% iron stearate and 95% PLA carrier resin. The film is produced by well-known extrusion methods, where the composition is extruded through a desired die at a temperature of about 355 to about 380 degrees Fahrenheit. After extrusion, the film is run into nip rollers, and finally to a roll stack.

Example 2

A degradable extruded film in accordance with this disclosure is manufactured using a mixture including 55% by weight Biopolymer 2003D as the PLA composition, 38% by weight F Blend C1200 as the PBAT composition, 2% by weight TECHMER PLAM111474 compatibilizer, and 5% by weight degradation additive, the degradation additive including 5% iron stearate and 95% PLA carrier resin. The film of the composition of Example 2 was extruded using the same method as Example 1.

Example 3

A degradable extruded film in accordance with this disclosure is manufactured using a mixture including 60% by weight Biopolymer 2003D as the PLA composition, 38% by weight F Blend C1200 as the PBAT composition, 2% by weight TECHMER PLAM111474 compatibilizer, and no degrader additive. The film of Example 3 was extruded using the same method as Example 1.

Example 4

A degradable extruded film in accordance with this disclosure is manufactured using a mixture including 55% by weight Biopolymer 2003D as the PLA composition, 38% by weight F Blend C1200 as the PBAT composition, 2% by weight TECHMER PLAM111474 compatibilizer, 2.5% degradation additive having iron stearate, and 2.5% by weight degradation additive having manganese stearate. The degradation additive including 2.5% iron stearate, 2.5% manganese stearate, 95% PLA carrier resin. The film of the composition of Example 4 was extruded using the same method as Example 1.

Example 5

A degradable extruded film in accordance with this disclosure is manufactured using a composition of polypropylene. No degrader additive was used. The film of the composition of Example 5 was extruded using the same method as Example 1.

Example 6

A degradable extruded netting in accordance with this disclosure is manufactured using a mixture including 57% by weight Biopolymer 2003D sold under the trade name Ingeo™ available from NatureWorks as the PLA composition, 38% by weight F Blend C1200 sold under the trade name ECOFLEX®, available from BASF SE as the PBAT composition, 2% by weight TECHMER PLAM111474 compatibilizer, and 3% by weight degradation additive, the degradation additive including 5% iron stearate and 95% PLA carrier resin. The netting was produced by extruding the composition through dies with reciprocating or rotating parts to form the netting configuration. The extruded netting was then stretched in the machine and cross directions at a temperature of 100 degrees F. to 250 degrees F.

Example 7

A degradable extruded netting in accordance with this disclosure is manufactured using a mixture including 55% by weight Biopolymer 2003D as the PLA composition, 38% by weight F Blend C1200 as the PBAT composition, 2% by weight TECHMER PLAM111474, and 5% by weight degradation additive, the degradation additive including 5% iron stearate and 95% PLA carrier resin. The netting was produced using the same procedure as in Example 6.

Example 8

A degradable extruded film in accordance with this disclosure is manufactured using a mixture including 50% by weight Biopolymer 2003D sold under the trade name Ingeo™ available from NatureWorks as the PLA composition and 50% by weight FD92 sold under the trade name BioPBS™ available from PTT MCC Biochem Co., Ltd. as the PBS composition. No degrader additive was used. The film of the composition of Example 8 was extruded using the same method as Example 1.

Example 9

A degradable extruded film in accordance with this disclosure is manufactured using a mixture including 50% by weight Biopolymer 2003D sold under the trade name Ingeo™ available from NatureWorks as the PLA composition and 50% by weight FZ91 sold under the trade name BioPBS™ available from PTT MCC Biochem Co., Ltd. as the PBS composition. No degrader additive was used. The film of the composition of Example 9 was extruded using the same method as Example 1.

Example 10

A degradable extruded film in accordance with this disclosure is manufactured using a composition of 97% by weight polypropylene and 3% by weight Envirocare Ag 1000C commercially available from Ciba Specialty Chemicals of Great Britain, believed to contain 50% to 80% polyethylene, 7.5% to 22.5% cobalt stearate, and 7.5% to 22.5% citric acid. The film of Example 10 is sold under the trade name Oxygrid™ available from Conwed. The film of the composition of Example 10 was extruded using the same method as Example 1.

Example 11

A degradable extruded film in accordance with this disclosure is manufactured using a mixture including 58% by weight Biopolymer 2003D as the PLA composition, 40% by weight F Blend C1200 as the PBAT composition, and 2% by weight degradation additive, the degradation additive including 5% iron stearate and 95% PLA carrier resin. The film of the composition of Example 11 was extruded using the same method as Example 1.

Example 12

A degradable extruded film in accordance with this disclosure is manufactured using a mixture including 70% by weight Biopolymer 2003D as the PLA composition, 15% by weight F Blend C1200 as the PBAT composition, and 15% by weight polyhydroxybutyrate (PHBH). The film of the composition of Example 12 was extruded using the same method as Example 1.

Figure 2:
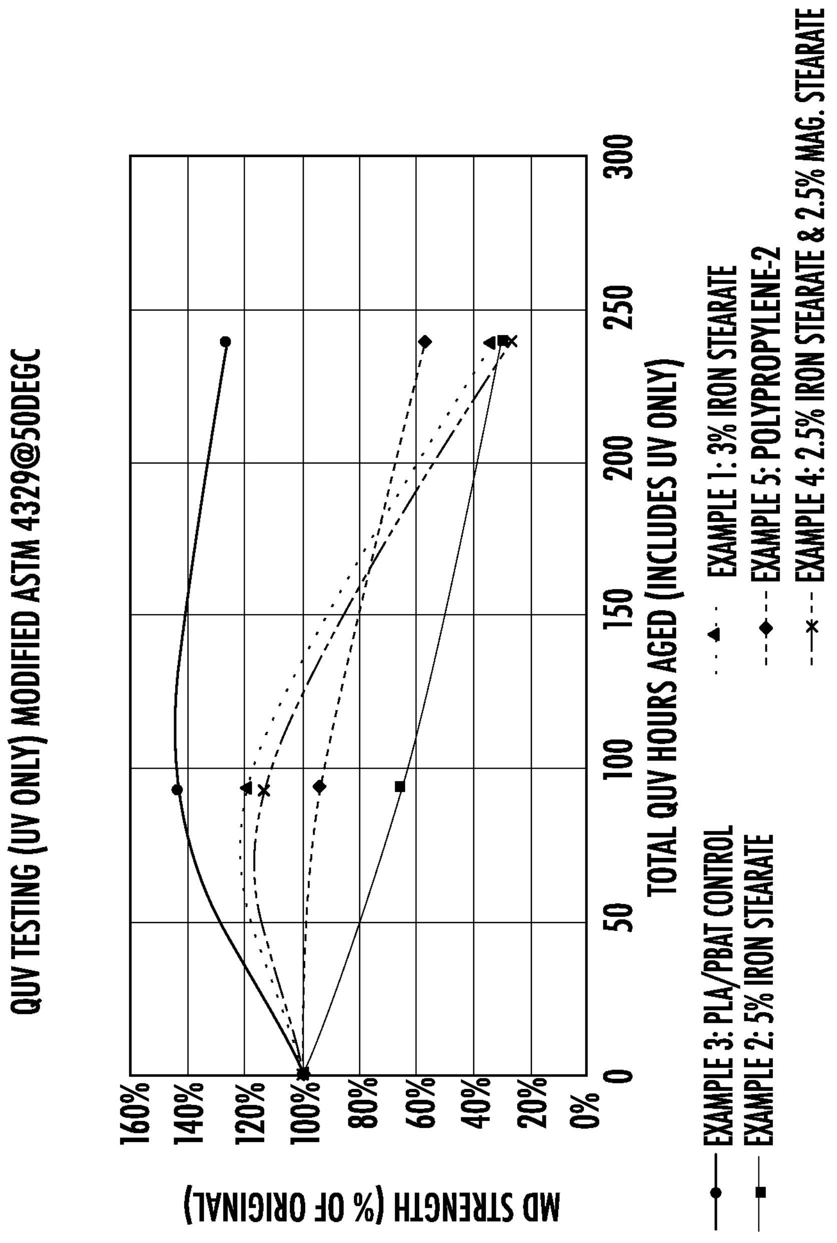
FIG. 2 depicts QUV Testing Data gathered from extruded films made from compositions in accordance with Examples 1-5 as well as comparative compositions showing percentage of strength loss in the machine direction over time.
Figure 3:
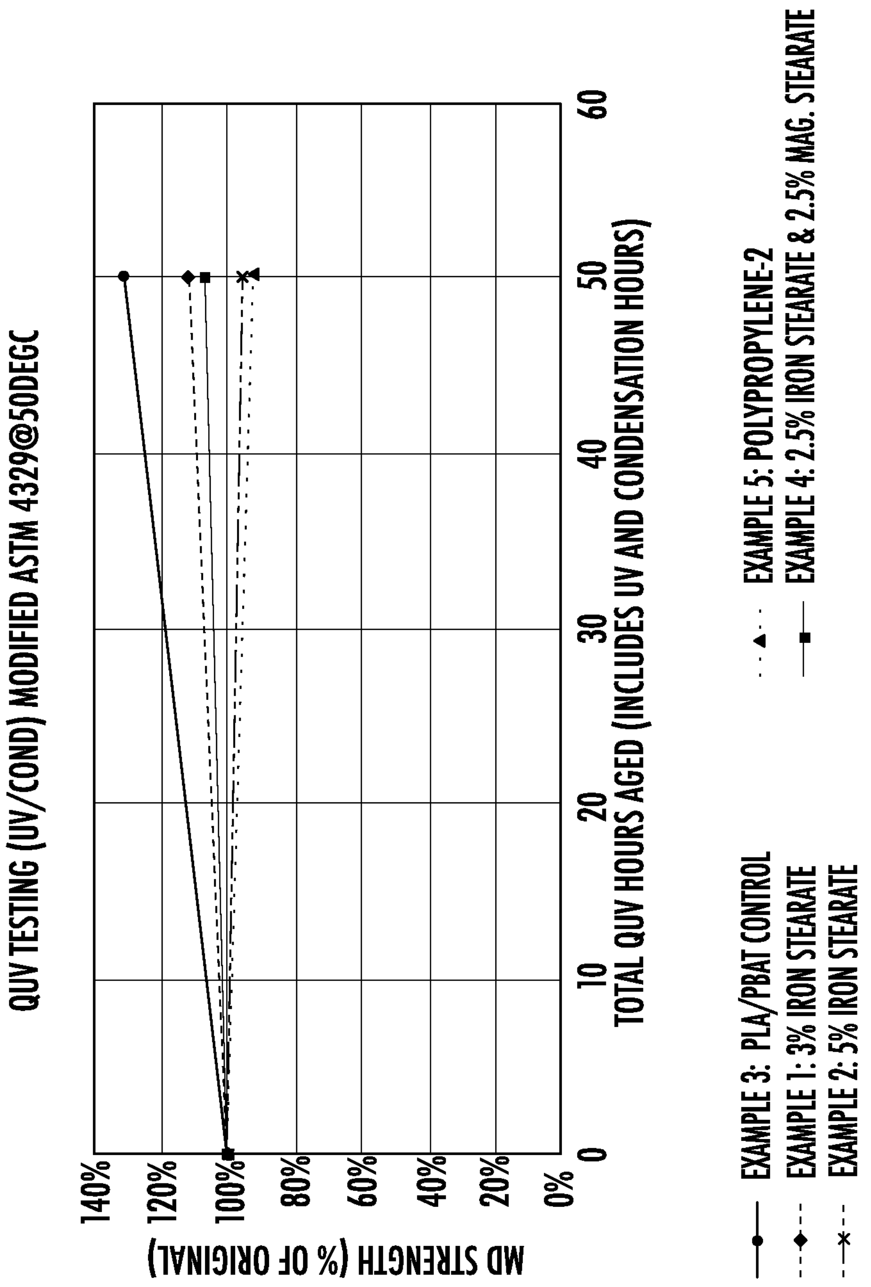
FIG. 3 depicts QUV with Condensation Testing Data gathered from extruded films made from compositions in accordance with Examples 1-5 as well as comparative compositions showing percentage of strength loss in the machine direction over time.

Testing of the strength loss in the machine direction (MD strength loss) were performed on the films of Examples 1, 2 and 4, a PLA/PBAT control film (Example 3), and a polypropylene with no degradative additive (Example 5). The MD strength loss of each sample was collected through QUV-Accelerated Weathering testing that follows a slightly modified version of the procedures outlined in ASTM D4329-13. Q-Panel, QUV-Basic, and QUV-EM, were used to expose samples to conditions of 50 degrees Celsius with and without condensation. UVA-340 lamps were used over the course of 240 hours in an attempt to recreate conditions similar to that of a typical outdoor environment for an extended period of time. The data collected from these strength loss tests is shown in FIGS. 2-3.

Figure 4:
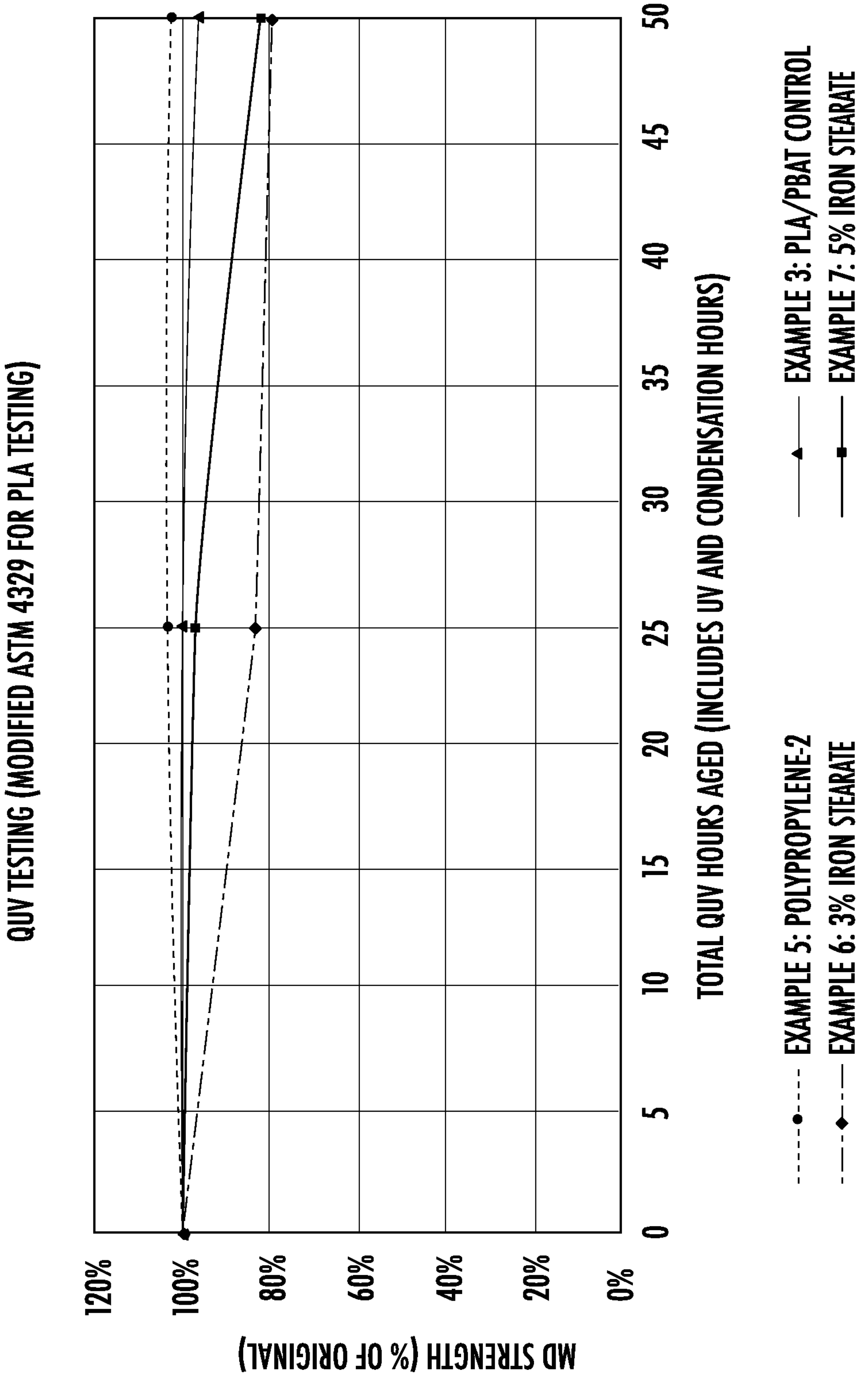
FIG. 4 depicts QUV Testing Data gathered from extruded netting made from compositions in accordance with Examples 3 and 5-7 as well as comparative compositions showing percentage of strength loss in the machine direction over time.

Testing of the strength loss in the machine direction (MD strength loss) of illustrative degradable extruded nettings were performed on nettings made from the compositions of Examples 6 and 7 as well as the PLA/BPAT control of Example 3 and the polypropylene of Example 5. The data collected from these strength loss tests is shown in FIG. 4.

Heat stability testing was conducted on films made from the compositions of Examples 1, 2, and 4, a PLA/PBAT control (Example 3). No heat stabilizers were included with the given formulations. To test the material, film samples were run on a cast film line at 365 degrees Fahrenheit to determine which compositions may show signs of thermal degradation within the extrusion device during processing due to the compositions heat profile. Degradation during processing results in a lower pounds of force per inch measurement for a given example, as the polymer breaks down via hydrolysis, depolymerization, oxidation, etc. The data gathered from the heat stability testing is shown in Table 1, below. The PLA/PBAT Control (Example 3) had a force per square inch value that was 5061 lb/square inch. Examples 1 and 2 had a higher value, while the Example 4 showed signs of degradation and therefore had lower values.

TABLE 1

| EXAMPLE | Composition in % | Average Lb. Force | Average Thickness (in) | Lb. Force/ Square Inch | QUV Accelerated Weathering Rank Performance (Faster = lower #) |
|---|---|---|---|---|---|
| 1 | 57 PLA/38 PBAT/2 Compatabilizer/3% Degrader Additive having Iron Stearate | 12.0 | 0.0084 | 5714.29 | 5.5 |
| 2 | 55 PLA/38 PBAT/2 Compatabilizer/5% Degrader Additive having Iron Stearate | 12.2 | 0.0090 | 5422.22 | 4 |
| 3 | 60 PLA/38 PBAT/2 Compatabilizer (no degrader) | 12.4 | 0.0098 | 5061.22 | 9 |
| 4 | 55 PLA/38 PBAT/2 Compatabilizer/Degrader Additive having 2.5% Iron Stearate & 2.5% Manganese Stearate | 12.8 | 0.0105 | 4883.81 | 4 |

In embodiments in which illustrative degradable nettings are used for preparing sod, it is desirable to provide for degradable netting that is substantially bio-based without sacrificing affordability or manufacturability. Modulus and tensile strength testing was performed on blends of varying amounts of PLA and PBS. The PLA composition was Biopolymer 2003D. The PBS compositions tested were BioPBS FZ91 and BioPBS FD92. Blends including 0% PBS, 25% PBS, 50% PBS, 75% PBS and 100% PBS were tested and compared to PLA/PBAT/Techmer blend including 60%, 38% PBAT, and 2% Techmer™ PLAM111474 compatibilizer and a composition made in accordance with Example 10 above, sold under the trade name Oxygrid™ available from Conwed. The data gathered from this testing is shown in FIGS. 5 and 6.

Figure 5:
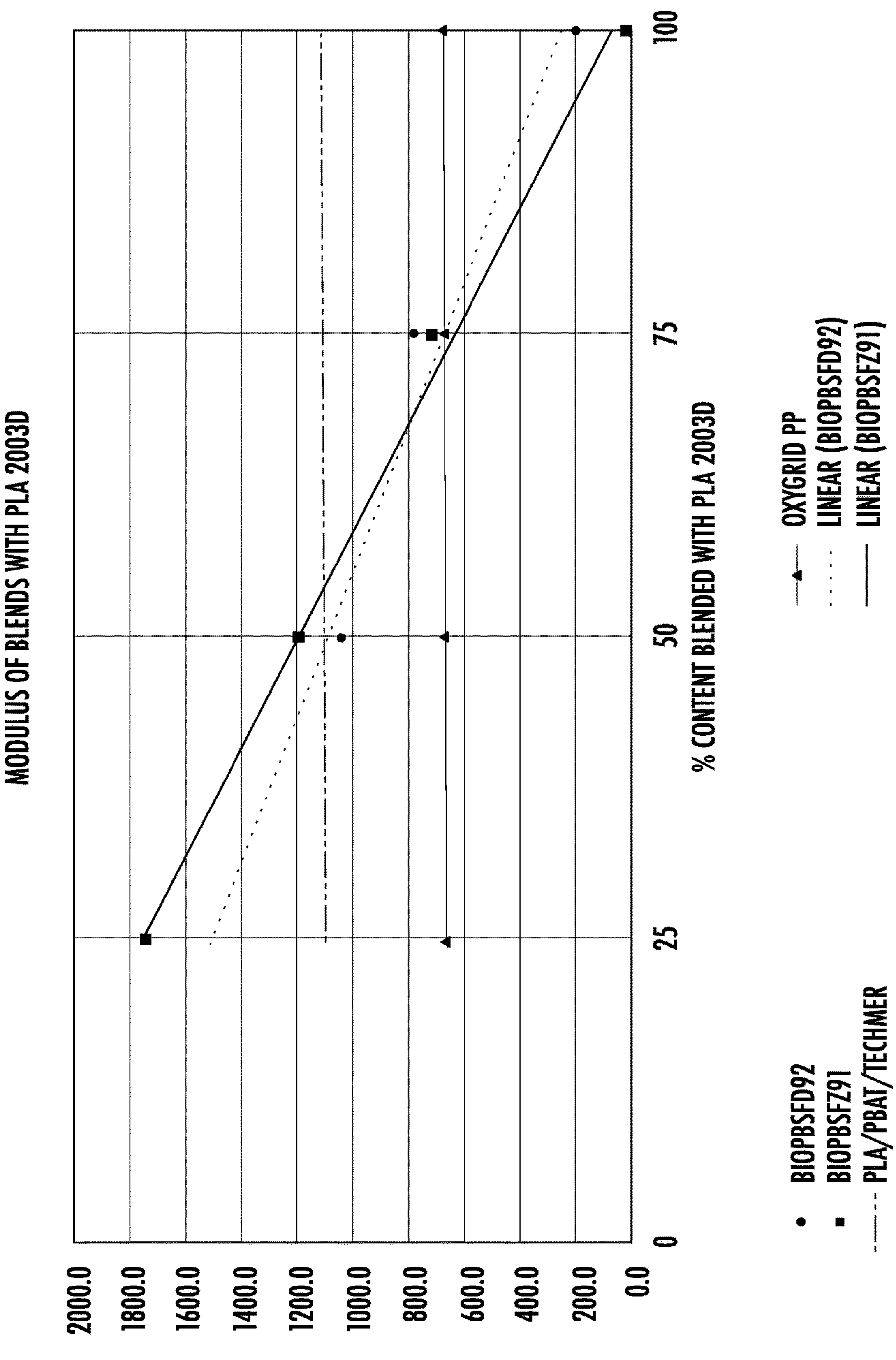
FIG. 5 depicts Modulus data of blends made from illustrative compositions as well as Examples 7-10.

As shown in FIG. 5, film made from a blend including 50% PLA 2003D and 50% bioPBS FD92, the composition of Example 8, has a modulus value that is lower than the film made from a blend including PLA/PBAT/Techmer (Example 7), and thus provides increased manufacturability.

Figure 6:
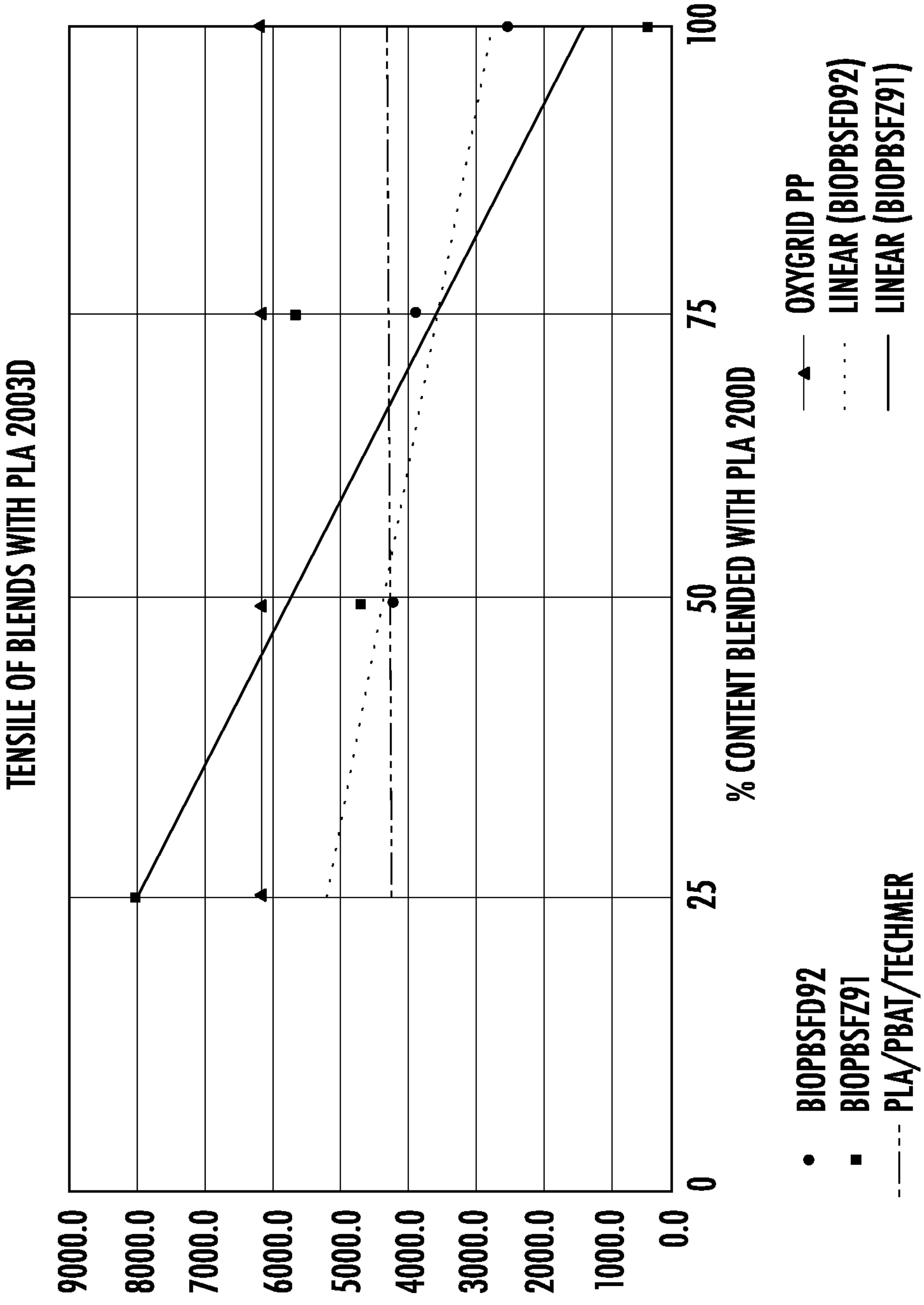
FIG. 6 depicts tensile strength data of blends made from illustrative compositions as well as Examples 7-10.

As shown in FIG. 6, the increased manufacturability attained by a film made from a mixture including 50% PLA 2003D and 50% bioPBS FD92, the composition of Example 8, is achieved while maintaining suitable tensile strength in comparison to the PLA/PBAT/Techmer control film.

Figure 7:
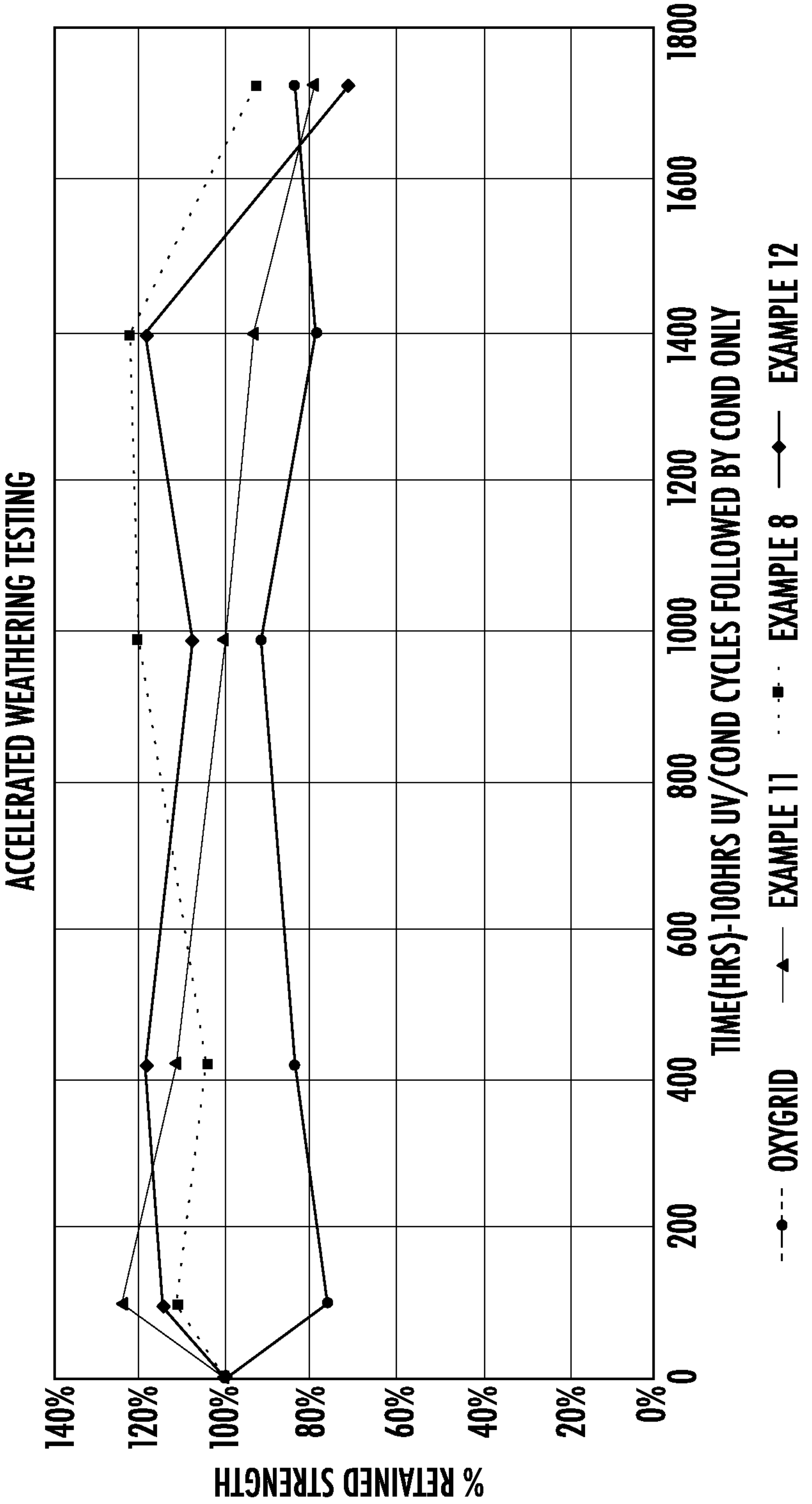
FIG. 7 depicts QUV Testing Data gathered from extruded netting made from compositions in accordance with Examples 8 and 10-12 as well as comparative compositions showing percentage of retained strength over time.

Testing of the strength loss in the machine direction (MD strength loss) were performed on the films of Examples 8 and 10-12 through accelerated weathering testing. The percentage of retained strength of each sample was collected through QUV-Accelerated Weathering testing that follows a modified version of the procedures outlined in ASTM D4329-13. Q-Panel, QUV-Basic, and QUV-EM, were used to expose samples to two different cycles designed to simulate conditions similar to that of a typical outdoor environment for an extended period of time. The first cycle was 4 hours in length and provided for UV light at 50 degrees Celsius. The second cycle was 4 hours in length with no light at 40 degrees Celsius. UVA-340 lamps were used. After 100 hours of alternating between the two cycles, the samples were exposed to outdoor temperature and moisture levels of about 45 degrees Celsius, and about 80% humidity. The data collected from the strength loss testing is shown in FIG. 7. As shown in FIG. 7, the film produced from the composition of Example 8 performs similarly to the control film (Example 10) under accelerated weathering testing.

Illustrative embodiments of degradable nettings can also be used to form other types of composites wherein the netting is secured to at least one or more layers of material. Examples of such composites include consumer wipes, reinforced tissue towels, and erosion control composites. Depending on the desired function of the netting, one of ordinary skill could determine which compositions should be used in making each layer, thereby controlling the rate of degradation.

Hereby, all issued patents, published patent applications, and non-patent publications that are mentioned in this specification are herein incorporated by reference in their entirety for all purposes, to the same extent as if each individual issued patent, published patent application, or non-patent publication were specifically and individually indicated to be incorporated by reference.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of presently disclosed embodiments. Thus the scope of the embodiments should be determined by the appended claims and their legal equivalents, rather than by the examples given.

Persons skilled in the art will understand that the devices and methods specifically described herein and illustrated in the accompanying drawings are non-limiting exemplary embodiments. The features illustrated or described in connection with one exemplary embodiment may be combined with the features of other embodiments. Various alternatives and modifications can be devised by those skilled in the art without departing from the disclosure. Accordingly, the present disclosure is intended to embrace all such alternatives, modifications and variances. As well, one skilled in the art will appreciate further features and advantages of the present disclosure based on the above-described embodiments. Accordingly, the present disclosure is not to be limited by what has been particularly shown and described, except as indicated by the appended claims.

What is claimed is:

1. A polymeric blend composition suitable for preparing a degradable extruded netting, the polymeric blend composition comprising:

a polylactic acid composition in an amount ranging from about 55% to about 60% by weight;

a polybutyrate composition in an amount ranging from about 35% to about 40% by weight;

a compatibilizer composition in an amount ranging from about 0.5% to about 3% by weight; and a degradation additive in an amount ranging from about 2% to about 7% by weight, wherein the degradation additive comprises iron stearate and manganese stearate in a carrier resin.

2. The polymeric blend composition of claim 1 comprising:

about 55% to about 58% by weight of the polylactic acid composition;

about 38% by weight of the polybutyrate composition;

about 2% by weight of a compatibilizer, wherein the compatibilizer is a polylactic acid-polybutyrate compatibilizer; and about 2% to 5% by weight of the degradation additive.

3. The polymeric blend composition of claim 2 comprising:

about 55% to about 57% by weight of the polylactic acid composition; and about 3% to about 5% by weight of the degradation additive.

4. The polymeric blend composition of claim 1, wherein the degradation additive further comprises a metal carboxylate in the carrier resin.

5. The polymeric blend composition of claim 1, wherein the degradation additive comprises about 5% by weight of the iron stearate in the carrier resin, based on the total weight of the degradation additive.

6. The polymeric blend composition of claim 1, wherein the polybutyrate composition comprises one or more polybutylene adipate terephthalate (PBAT) polymers.

7. The polymeric blend composition of claim 1, wherein the polylactic acid composition comprises one or more polylactic acid polymers derived from plant starch.

8. The polymeric blend composition of claim 1, wherein the compatibilizer composition comprises a compatibilizer selected from polypropyleneglycol di glycidyl ether, epoxidized cottonseed oil (ECSO), or maleinized cottonseed oil (MCSO).

9. The polymeric blend composition of claim 1, wherein the degradation additive comprises iron stearate in an amount of about 2.5% by weight and manganese stearate in an amount of about 2.5% by weight, with respect to the total weight of the degradation additive.

10. A polymeric blend composition suitable for preparing a degradable extruded netting, the polymeric blend composition comprising:

a polylactic acid composition in an amount ranging from about 55% to about 60% by weight;

a polybutyrate composition in an amount ranging from about 35% to about 40% by weight; and a degradation additive in an amount ranging from about 2% to about 7% by weight, wherein the degradation additive comprises iron stearate and manganese stearate in a carrier resin.

11. The polymeric blend composition of claim 10, comprising:

about 55% to about 57% by weight of the polylactic acid composition about 38% by weight of the polybutyrate composition; and about 3% to about 5% by weight of the degradation additive.

12. The polymeric blend composition of claim 10, wherein the degradation additive further comprises a metal carboxylate in the carrier resin.

13. The polymeric blend composition of claim 10, wherein the degradation additive comprises about 5% by weight of the iron stearate in the carrier resin, based on the total weight of the degradation additive.

14. The polymeric blend composition of claim 10, wherein the polybutyrate composition comprises one or more polybutylene adipate terephthalate (PBAT) polymers.

15. The polymeric blend composition of claim 10, wherein the polylactic acid composition comprises one or more polylactic acid polymers derived from plant starch.

16. Grass sod comprising:

grass grown in soil; and degradable extruded netting in the soil, the degradable extruded netting including:

a plurality of interconnected strands, at least one of the plurality of interconnected strands being made from a polymeric blend, the polymeric blend comprising:

a polylactic acid composition in an amount ranging from about 55% to about 60% by weight;

a polybutyrate composition in an amount ranging from about 35% to about 40% by weight; and a degradation additive in an amount ranging from about 2% to about 7% by weight, wherein the degradation additive comprises iron stearate and manganese stearate in a carrier resin.

17. The grass sod of claim 16, wherein the degradation additive comprises about 5% by weight of the iron stearate in the carrier resin, based on the total weight of the degradation additive.

18. The grass sod of claim 16, wherein the degradation additive further comprises a metal carboxylate in the carrier resin.

* * * * *